US011383168B1

United States Patent
Thacker

(10) Patent No.: US 11,383,168 B1
(45) Date of Patent: Jul. 12, 2022

(54) SYSTEMS AND METHODS FOR DISTRIBUTION OF PERSONALIZED IN-GAME BENEFITS BASED ON UNIQUE DIGITAL ARTICLES THAT ARE RECORDED ON A PUBLIC PERMANENT REGISTRY

(71) Applicant: Mythical, Inc., Sherman Oaks, CA (US)

(72) Inventor: Cameron Thacker, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/517,064

(22) Filed: Nov. 2, 2021

(51) Int. Cl.
*A63F 13/79* (2014.01)
*A63F 13/67* (2014.01)
*A63F 13/53* (2014.01)

(52) U.S. Cl.
CPC .............. *A63F 13/67* (2014.09); *A63F 13/53* (2014.09); *A63F 13/79* (2014.09)

(58) Field of Classification Search
None
See application file for complete search history.

(56) References Cited

U.S. PATENT DOCUMENTS

| 2009/0117996 | A1* | 5/2009 | Death | G06Q 30/02 463/25 |
| 2011/0055733 | A1* | 3/2011 | Hamilton, II | A63F 13/358 715/757 |
| 2021/0118085 | A1* | 4/2021 | Bushnell | G06Q 20/123 |

\* cited by examiner

*Primary Examiner* — Damon J Pierce
(74) *Attorney, Agent, or Firm* — Esplin & Associates, PC

(57) ABSTRACT

Systems and methods to distribute unique digital articles to users accounts of a first permanent registry, and to facilitate personalized in-game benefits for players on an online gaming platform are disclosed. Exemplary implementations may effectuate a presentation of a user interface, obtain recorded information regarding ownership for user accounts, determine eligibility for distribution of a unique digital article, monitor in-game activity for use of the unique digital article by a first player, establish a correlation between a user account and the first player, determine an offer that is presented to the first player, and provide the offered item or article to the first player.

16 Claims, 4 Drawing Sheets

SYSTEMS AND METHODS FOR DISTRIBUTION OF PERSONALIZED IN-GAME BENEFITS BASED ON UNIQUE DIGITAL ARTICLES THAT ARE RECORDED ON A PUBLIC PERMANENT REGISTRY

FIELD OF THE DISCLOSURE

The present disclosure relates to systems and methods for distribution of personalized in-game benefits based on unique digital articles that are recorded on a public permanent registry.

BACKGROUND

Online gaming platforms are known. Distributed registries are known techniques to produce a secure record or registry of rights pertaining to items or articles, transactions, and other information. Many types of digital articles are known.

SUMMARY

One aspect of the present disclosure relates to a system configured to distribute personalized in-game benefits based on unique digital articles that are recorded on a public permanent registry. The system may include an online gaming platform, an administration server, a registry server, and/or other components. The online gaming platform, the administration server, and/or the registry server may include one or more (physical/hardware) processors configured by machine-readable instructions to effectuate a presentation of a user interface, obtain recorded information regarding ownership for user accounts, determine eligibility for distribution of a unique digital article, monitor in-game activity for use of the unique digital article by a first player, establish a correlation between a user account and the first player, determine an offer that is presented to the first player, and provide the offered item or article to the first player.

Another aspect of the present disclosure related to a method of distributing unique digital articles to users accounts of a public permanent registry, and of facilitating personalized in-game benefits for players on an online gaming platform. The method may include effectuating a presentation of a user interface, obtaining recorded information regarding ownership for user accounts, determining eligibility for distribution of a unique digital article, monitoring in-game activity for use of the unique digital article by a first player, establishing a correlation between a user account and the first player, determining an offer that is presented to the first player, and providing the offered item or article to the first player.

As used herein, any association (or relation, or reflection, or indication, or correspondency, or correlation) involving servers, processors, client computing platforms, players, player accounts, inventories, articles, digital articles, requests, responses, transactions, in-game actions, awards, permanent registries, metrics, metric values, scores, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
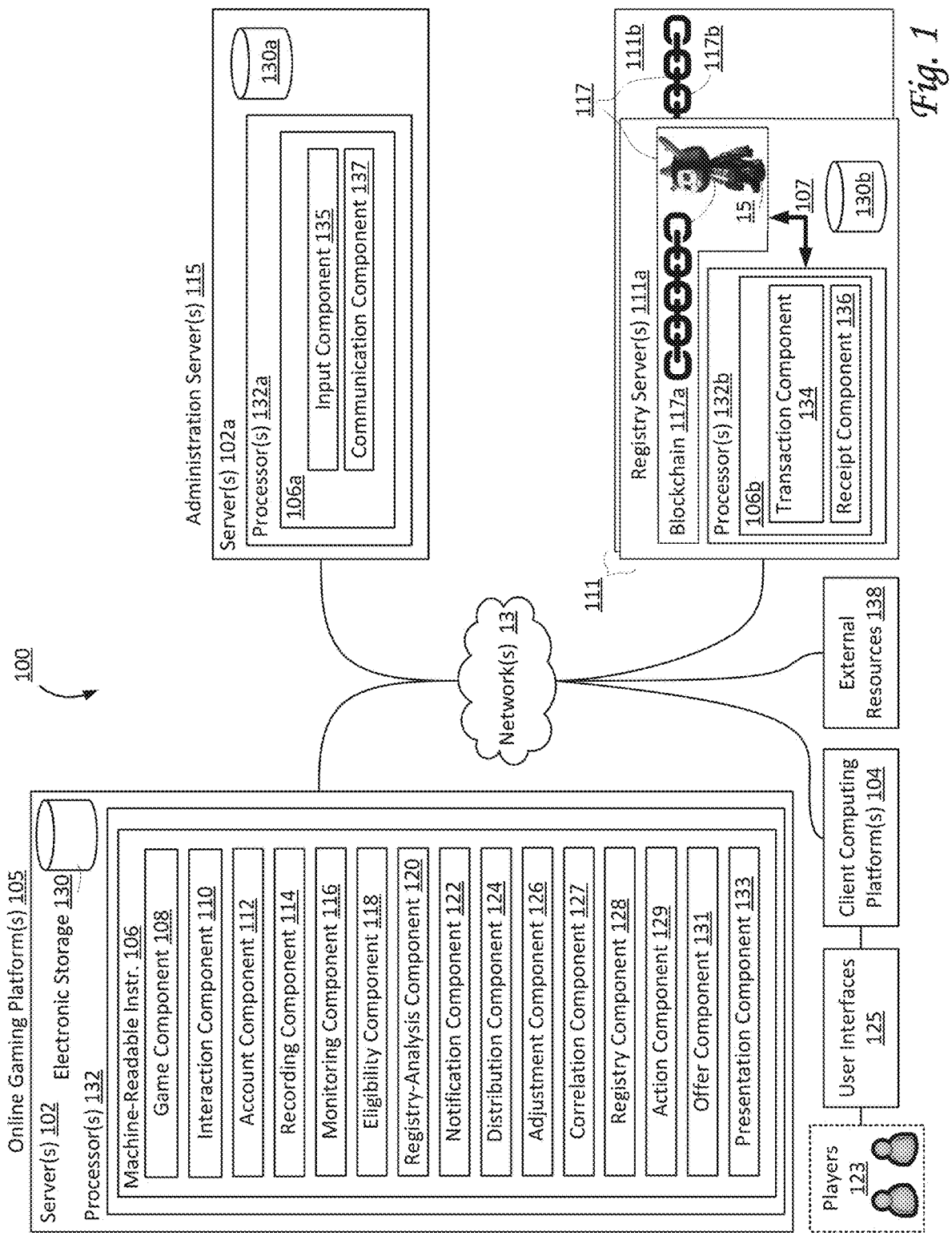
FIG. 1 illustrates a system configured to distribute personalized in-game benefits based on unique digital articles that are recorded on a public permanent registry, in accordance with one or more implementations.

FIG. 1 illustrates a system 100 configured to distribute personalized in-game benefits based on unique digital articles that are recorded on a public permanent registry, in accordance with one or more implementations. As a preliminary and non-limiting example, by virtue of the systems and methods described in this disclosure, unique digital articles may be distributed to user accounts on a public permanent registry, such as a blockchain. These distributions may also be referred to as airdrops. For example, a unique digital article may be associated with an in-game user-controllable character. Once these unique digital articles are registered for use in an online gaming platform, a relation or correlation may be established between individual user accounts on the public permanent registry and individual players (or player accounts) in the online gaming platform.

These particular user accounts may be analyzed to determine personalized offers (that provide in-game benefits in the online gaming platform) for the particular players.

As used herein, the term "unique digital article" may refer to digital articles that are uniquely identified and/or uniquely identifiable, e.g., by an identifier or by other identifying information. For example, in some implementations, an identifier or identifying information may include or be based on a combination of different types of information, including but not limited to information regarding the type of a digital article, a serial number and/or other numerical identifier of the digital article, and/or other types of information. As used herein, rights pertaining to unique digital articles may be monitored, tracked, recorded, and/or otherwise registered on one or more permanent registries 117. As such, a unique digital article may be a registry-tracked unique digital article. In some cases, these rights may include ownership.

Individual unique digital articles may be associated and/or otherwise correlated with another entity (which may be referred to as a "correlated entity") by virtue of technology provided and/or supported by one or more permanent registries 117 on which rights pertaining to the individual unique digital articles are tracked (including but not limited to smart contracts and/or other executable code on one or more permanent registries 117). Accordingly, rights pertaining to a unique digital article may provide one or more rights (e.g., accessibility, control, ownership, etc.) with respect to the correlated entity. Transactions involving a unique digital article recorded on a permanent registry may correlate to certain transactions (or modifications) of the correlated entity, and/or vice versa.

In some implementations, correlated entities may be (or include) virtual items configured to be used within online-gaming platform 105 (such as, for example, a player-controllable in-game virtual character that is usable within an instance of a game within online gaming platform 105). Other types and/or combinations of correlated entities are envisioned within the scope of this disclosure, including but not limited to physical and/or virtual objects, items, rights, memberships, grants, etc. The use of the singular "entity" or "correlated entity" is not intended to be limiting, as multiple different objects, items, rights, memberships, grants, etc. may be correlated to a single unique digital article. By way of non-limiting example, a correlated entity may be an art work, a ticket to an event, a subscription to certain media content, a bundle of rights related to captured audio and/or video information, ownership of or accessibility to distribution gains, and so forth. As used herein, the term "non-fungible token" or "NFT" may be used to refer to a combination of a particular unique digital article and a particular correlated entity that is correlated to the particular unique digital article.

System 100 may include one or more online gaming platforms 105, registry server(s) 111, administration server(s) 115, client computing platform(s) 104, user interface(s) 125, server(s) 102, external resource(s) 138, and/or other components. Players 123 (also referred to as users) may include one or more of a first player, a second player, a third player, a fourth player, an administrative user, and/or other players. Players 123 may include players who play and/or otherwise interact on online gaming platform 105. As used in descriptions herein, any use of the term "player" may refer to player(s) 123, unless indicated otherwise. Electronic storage 130a and electronic storage 130b may be similar to electronic storage 130 as described elsewhere in this disclosure, though included in administration servers 115 and registry servers 111, respectively, as depicted in FIG. 1.

Instances of games may be executed within one or more online gaming platforms 105. As used herein, online gaming platform(s) 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital items (e.g., characters, weapons, resources, etc.) to players 123 of online gaming platform 105.

Referring to the game and to online gaming platform 105, in some implementations, individual players may own and/or control individual unique digital articles, correlated entities, and/or other virtual items, and exchange these with (or to) other individual players. As used herein, exchanges refer to individual players winning, losing, auctioning, selling, purchasing, trading, bartering, wagering, staking, and/or otherwise exchanging virtual items (directly, without a store or store interface under control of online gaming platform 105) to other individual players or with other individual players (including exchanging virtual items through player-to-player challenges). Due to an exchange, ownership rights of a digital article may transition from an original owner to a new owner (even if there may, in some implementations, be one or more intermediary and/or temporary owners during the process of performing the exchange). In some implementations, unique digital articles may be associated and/or correlated with other rights than ownership rights, such as, by way of non-limiting example, distribution rights.

In some implementations, distribution rights of (unique) digital articles may reflect rights held by the individual ones of the players 123 to receive certain distributions of awards upon exchanges involving the particular digital articles. For example, individual players 123 may own rights related to particular digital articles that guarantee them awards upon (future) exchanges involving those digital articles regardless of whether the individual players 123 own those digital articles (at the time of the particular exchange). In some implementations, the distribution gains may result from a particular action or activity (such as, e.g., a sale of a particular digital article), e.g., within the online gaming platform 105 or elsewhere, of a particular digital article. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the players that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital articles.

In some implementations, (unique) digital articles, correlated entities, and/or other virtual items may include and/or be virtual items that are not fungible and may be usable within online gaming platform 105. In some implementations, these may represent (three-dimensional) in-game player-controllable characters that can interact with other (in-game) virtual items within online gaming platform 105. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a player may use, own, sell, trade, destroy, and/or otherwise effectuate a change of ownership or control.

As used herein, a digital article may be fungible if it is functionally and/or physically indistinguishable from another digital article. For example, a payment token such as a Bitcoin is fungible. A digital article may be non-fungible if it is unique, or one-of-a-kind. For example, a specific individual CRYPTOKITTY™ may be non-fungible. A digital article may be semi-fungible if there is a set of a limited number of similar but distinguishable digital articles. For example, a limited-edition BLANKO™ or another in-game character may be semi-fungible. For example, one of a limited number of 2-dimensional or 3-dimensional in-game virtual items may be semi-fungible. For example, a digital ticket to a show, concert, exhibition, and/or other event may be semi-fungible. For example, a piece of art or jewelry (e.g., as a virtual item or as representing a physical item) may be semi-fungible. As used herein, semi-fungible digital articles are considered as unique, "not fungible", or non-fungible digital articles. In some implementations, digital articles may be usable within one or more games, e.g., on online gaming platform 105.

Registry server(s) 111 (e.g., registry server 111a, registry server 111b, and so forth) may be used to implement one or more permanent registries 117, including but not limited to blockchain 117a, blockchain 117b (partially visible in FIG. 1), and so forth. In some implementations, one or more permanent registries 117 may be decentralized and/or immutable registries (i.e., such a registry is append-only since previously added records are immutable). In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment (not shown in FIG. 1) for smart contracts and/or other executable code. A distributed computing platform may include electronic storage configured to store part or all of blockchain 117a. For example, the smart contracts may be stored on blockchain 117a, blockchain 117b, and/or another permanent registry. In some implementations, the distributed computing platform may be the EOSIO platform. In some implementations, the distributed computing platform may be similar to or based on the EOSIO platform. In some implementations, the distributed computing platform may be ETHEREUM. In some implementations, the distributed computing platform may be similar to or based on ETHEREUM. In some implementations, the virtual machine may be a distributed and/or decentralized virtual machine.

In some implementations, at least one of permanent registries 117 implemented by registry servers 111 is a private permissioned permanent registry (e.g., a private permissioned blockchain). The private permissioned permanent registry may be configured to record information. The recorded information may include information pertaining to unique digital articles that are associated and/or correlated with in-game player-controllable characters that are configured to be used in an instance of a game. The recorded information may include rights pertaining to the unique digital articles. Implementing the in-game actions in the instance of the game may include, for at least some of the in-game actions implemented in the instance of the game, effectuating modifications to the recorded information pertaining to the unique digital article. For example, ownership rights and/or other accessibility may be modified. In some implementations, a private permissioned permanent registry may be specific to a particular online gaming platform 105 and/or a particular (gaming-related) ecosystem. In some implementations, a unique digital article may be removed from one permanent registry and added or recorded on another permanent registry. In some implementations, at least one of permanent registries 117 implemented by registry servers 111 is a public permanent registry (e.g., a public blockchain). The public permanent registry may be configured to be part of either EOSIO mainnet, ETHEREUM mainnet, ETHEREUM 1.5, ETHEREUM 2.0, a derivative of ETHEREUM 2.0 that is configured to perform transactions of ETHER (ETH) between accounts, or a derivative of EOSIO that is configured to perform transactions of EOS between different accounts.

Elements of blockchain 117a or another permanent registry may be grouped together in units that are referred to as blocks. For example, an individual block may include one or more digital articles (or digital assets) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, smart contracts, and/or other information.

In some implementations, one or more permanent registries 117 implemented by registry servers 111 may be publicly accessible. In some implementations, one or more permanent registries 117 implemented by registry servers 111 may be private and/or permissioned. In some implementations, one or more permanent registries 117 implemented by registry servers 111 may be append-only (such that existing blocks are immutable once they have been added to the registry, and modifications are made by newly-added transactions). In some implementations, existing blocks of one or more permanent registries 117 implemented by registry servers 111 can substantially not be altered or deleted, unless multiple copies are altered. This is unlikely to happen provided that the multiple copies are stored on different computing platforms, e.g., in different geographical locations. Permanent registries 117 may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

As depicted in FIG. 1, registry server 111*a* may include one or more of electronic storage 130*b*, processor(s) 132*b*, machine-readable instructions 106*b*, (node of) blockchain 117*a*, and/or other components. Machine-readable instructions 106*b* may include one or more instruction components. The instruction components may include computer program components. The instruction components may include one or more of a transaction component 134, a receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117*a* may include a unique digital article 15 (by way of non-limiting example, unique digital article 15 may be correlated with a player-controllable in-game character, as depicted, and rights pertaining to unique digital article 15 may have been recorded on blockchain 117*a*, as depicted). Registry server 111*b* may include similar components as registry server 111*a*, including but not limited to blockchain 117*b* and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or registry server(s) 111 may be configured to communicate with one or more of online gaming platform(s) 105, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a game component 108, an interaction component 110, an account component 112, a recording component 114, a monitoring component 116, an eligibility component 118, a registry-analysis component 120, a notification component 122, a distribution component 124, an adjustment component 126, a correlation component 127, a registry component 128, an action component 129, an offer component 131, a presentation component 133, transaction component 134, receipt component 136, an input component 135, a communication component 137, and/or other instruction components. Processor(s) 132*a* and processor(s) 132*b* may be similar to processor(s) 132 as described elsewhere in this disclosure, though included in administration servers 115 and registry servers 111, respectively, as depicted in FIG. 1. Machine-readable instructions 106*a* and machine-readable instructions 106*b* may be similar to machine-readable instructions 106 as described elsewhere in this disclosure, though included in administration servers 115 and registry servers 111, respectively, as depicted in FIG. 1.

Game component 108 is configured to execute, via online gaming platform 105, one or more instances of one or more games. An instance of a game may facilitate presentation of the game to players 123. For example, the instance of the game may be an online game executed with online gaming platform 105. Game component 108 may be configured to implement in-game actions in the instance of the game, e.g., in response to (action) requests for the in-game actions by the players. These in-game actions and/or action requests may be tracked, monitored, analyzed, and/or otherwise used, e.g., as described in relation to monitoring component 116. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

By way of non-limiting example, system 100 may track how often players interact with a game, how long players play a game, how fast players progress or level up within a game, how long players spent in an in-game store or game-related online marketplace, how much currency players spent on a game, and much more. In some implementations, players may be classified according to this tracked information (e.g., as an investor, a collector, a gamer, and/or as another classification, or combination of different classifications). For example, in some online gaming platforms 105, particular virtual items (e.g., player-controllable in-game characters that are correlated to unique digital articles) may be boxed and/or otherwise pristine and unused upon their original purchase. In some implementations, once the particular virtual item is unboxed and/or otherwise used within a game, its status cannot be reverted to being boxed. Keeping virtual items boxed (which is potentially more valuable) may be more typical for an investor-type player than for a gamer-type player. Buying, selling, and/or trading virtual items often may be more typical for a collector-type player than for an investor-type player (who may be more likely to hold on to boxed items for a relatively long time before doing anything with these boxed items). Likewise, in-game activity by players may be distinctive, and may be used for classification of players (or for distinguishing different levels within the same classification).

The presentation of the game (e.g., by presentation component 133) may be based on the views of the game that are determined during execution of the game, e.g., as based on instructions and/or other input from players. In some implementations, the view may be communicated (e.g., by streaming, via object/position data, and/or other information) from online gaming platform 105, registry server(s) 111, and/or other sources to client computing platforms 104 for presentation to players 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by player 123.

The instance of the game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, players 123 may control characters, objects, simulated physical phenomena, and/or other elements within the virtual space to interact with the virtual space and/or each other. The characters may include avatars. As used herein, the term "character" or "player character" may refer to an object or group of objects present in the virtual space, that correspond(s) to an individual player. A particular player character may be controlled by the particular player with which it is associated. Such player characters may be referred to as player-controllable characters. In some cases, a player-controllable character may be the correlated entity that is correlated to a unique digital article. Player-controllable element(s) may move through and interact with the virtual space (e.g., non-player characters in the virtual space, other objects in the virtual space, etc.). In some implementations, player-controllable characters may be capable of locomotion within the topography of the simulated space that is included in the instance of the game. For example, different player-controllable characters may interact in the topography of the simulated space. In some implementations, the topography may include one or more restricted areas that are only accessible under certain conditions. In some implementations, player-controllable elements controlled by and/or associated with a given player may be created and/or customized by the given player. Individual players 123 and/or player accounts may own or control an inventory of virtual goods and currency (e.g., resources of a plurality of resource types) that the individual player can use (e.g., by manipulation of a player character and/or other player-controllable elements) and/or other items, to perform in-game actions within the virtual space. By way of non-limiting illustration, players 123 may include the first player and the second player that interact with online gaming platform 105. The first player and the second player may control digital articles in or through a game hosted by online gaming platform 105. In some implementations, account inventories may be managed (at least in part) using blockchain 117a. For example, ownership rights (and/or other types of rights) of individual virtual items included in an individual account inventory may be recorded on blockchain 117a. In some implementations, at least some individual virtual items (also referred to as correlated entities) may correlate to individual unique digital articles (that may be tracked by registry servers 111). In some implementations, individual account inventories may correspond to individual smart contracts stored on blockchain 117a.

Interaction component 110 may be configured to enable, facilitate, and/or implement in-game actions by players 123 in instances of games. In some implementations, interaction component 110 may be configured to operate in response to instructions and/or (action) requests by players 123. Interaction component 110 may be configured to receive requests from players 123, e.g., in-game action instructions to perform in-game actions in the instance of the game. By way of non-limiting example, in-game actions may include one or more of logging in to a game, performing a move, a dance, a movement, and/or another action within the game, accessing a level or area within the game, browsing a store/shop/marketplace within the game, using a particular item, weapon, or another resource within the game, unboxing a new player-controllable character, participating in a particular game mode (e.g., a Battle Royale mode, or team-versus-team mode), join a particular mission or team, engage in a particular type of exchange and/or challenge between players, and/or other in-game actions. For example, one or more players may interact within online gaming platform 105 to build, create, gather, find, combine, and/or otherwise generate content (i.e., player-generated content). In some implementations, a player request may request access to a particular type of store or to a particular section of a store and/or marketplace within online gaming platform 105. In some implementations, information regarding in-game actions and/or in-game action instructions by particular players may be monitored, tracked, and/or otherwise used by other components of system 100, including but not limited to monitoring component 116.

In some implementations, operations may be accomplished by interaction component 110 through user interfaces 125. In particular, operations pertaining to a particular player may be accomplished or controlled or initiated through a particular user interface 125 of a particular client computing platform 104, where the particular client computing platform 104 is associated with the particular player. In other words, the particular player may interact with an instance of a game through interaction component 110 and/or the particular user interface 125. In some implementations, operations by interaction component 110 may be limited, restricted, and/or otherwise controlled by other components of system 100. In some implementations, interaction component 110 may require acceptance from particular players (e.g., to perform certain operations). For example, an acceptance may be required to accept a particular offer (e.g., an offer to partake in an activity or agreement). In some implementations, interaction component 110 may be configured to receive indications of acceptances and/or other agreements from players.

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual player interface 125 may be player-specific and/or specific to a particular client computing platform 104. In some implementations, interaction component 110 may facilitate entry and/or selection through (presentation of) one or more user interfaces 125 (such as, by way of non-limiting example, any of the interfaces described in this disclosure).

Account component 112 is configured to manage player accounts. Player accounts may be associated with players 123. Player accounts may be associated with online gaming platform 105. Player accounts may include and/or be associated with (player) account inventories of virtual items. For example, the player accounts may include a first player account associated with a first player, a second player account associated with a second player, and so forth. For example, the first player account may include a first account inventory of one or more virtual items, the second player account may include a second account inventory of one or more virtual items and so forth. Individual players may control one or more virtual items in their individual account inventories. In some implementations, the first account inventory includes one or more unique digital articles (e.g., a first unique digital article, a first set of unique digital articles, etc.). In some implementations, the second account inventory includes one or more unique digital articles (e.g., a second unique digital article, a second set of unique digital articles, etc.). The first unique digital article may be correlated with a first in-game player-controllable character configured to be used (e.g., played with) in the instance of the game. The second unique digital article may be correlated with a second in-game player-controllable character configured to be used (e.g., played with) in the instance of the game, and so forth. In some implementations, virtual items (e.g., unique digital articles) may be associated with location information (e.g., location within the simulated space of an instance of a game, or a real-world location). In some implementations, account information may include an amount of currency spent in a game, or on unique digital articles, a rate of spending, a type of items currency has been spent on, etc. Player accounts within online gaming platform 105 may be distinct and different from user accounts on one or more permanent registries 117, even though a particular player controlling a player account may be the same person as a particular user controlling a particular user account. Correlation component 127 may establish, create, store, and/or otherwise manage connections between player accounts and user accounts.

Recording component 114 is configured to record information, assets, and/or (unique) digital articles on permanent registries 117. In some implementations, the information may include executable code, such as, e.g., smart contracts. In some implementations, recording component 114 may record and/or modify rights pertaining to digital articles (such as, e.g., ownership rights). In some implementations, recording component 114 may be configured to receive (recordation) requests to perform a recordation (e.g., of a unique digital article or a smart contract on a permanent registry). For example, recording component 114 may receive, from a first player, a recordation request to record and/or modify rights pertaining to a first unique digital article on a first permanent registry (such as, e.g., blockchain 117a). In some implementations, recording component 114 may receive such requests from online gaming platform 105 and/or other components of system 100. For example, a particular request to record (rights pertaining to) a particular unique digital article may correspond to the issuance and/or creation of that particular unique digital article. When a unique digital article or other digital article is issued and/or created, recording component 114 may record its ownership on a particular permanent registry. In some implementations, a particular request to modify rights pertaining to a particular unique digital article may correspond to an exchange of that particular unique digital article (e.g., between two players).

In some implementations, recording component 114 may be configured to record executable code on a particular permanent registry, such as, e.g., blockchain 117a. In some implementations, particular executable code may be a particular smart contract. The particular smart contract may be configured to perform one or more evaluations, e.g., based on real-world information. In some implementations, smart contracts may be configured such that one or more evaluations are based, at least in part, on geolocation information associated with players or unique digital articles.

Monitoring component 116 may be configured to monitor information on one or more permanent registries 117, including but not limited to blockchain 117a, blockchain 117b, and/or other blockchains. The monitored information may include information recorded on one or more permanent registries 117. For example, the monitored information may include player-specific recorded information, such as at least one of: recorded information specific to a particular player, to a particular player account, to a particular account inventory, to a particular set of unique digital articles (e.g., owned or controlled by the particular player), and/or otherwise player-specific information. In some implementations, recorded information may regard third-party unique digital articles or third-party NFTs that are not related to a particular game on online gaming platform 105.

In some implementations, monitoring component 116 may be configured to track, monitor, analyze, and/or otherwise use information recorded on one or more permanent registries 117. In some implementations, monitoring component 116 may be configured to monitor player-specific recorded information or group-specific (i.e., for a group of players) recorded information. For example, player-specific recorded information for a particular player may include recorded information for any item in the particular player's account and/or inventory that is recorded on one or more permanent registries 117. For example, the particular player may own and/or control a set of unique digital articles for which ownership information is recorded on blockchain 117a. Monitoring component 116 may track, monitor, analyze, and/or otherwise use information from any transaction involving any of this set of unique digital articles. In some implementations, monitoring component 116 may be configured to analyze recordations and other transactions on one or more permanent registries 117, e.g., by retrieving recorded information from one or more permanent registries 117 and analyzing whether any of the recorded transactions pertain to a particular unique digital article, or a particular set of unique digital articles. By way of non-limiting example, the recorded information may include per-player information (e.g., number of unique digital articles owned, amount of currency spent on owned unique digital articles, estimated value of currently owned unique digital articles, etc.), as well as aggregate information for groups of players (e.g., a set of players that have been classified with a similar classification, such as collector). Operations by monitoring component 116 may be used to control operations by other components of system 100, including but not limited to interaction component 110.

In some implementations, monitoring component 116 may be configured to classify players based on information recorded on one or more permanent registries 117. Operations in system 100 may be based on these classifications. In some implementations, monitoring component 116 may determine how many unique digital articles and/or other objects are currently owned by a particular player. In some implementations, monitoring component 116 may determine and/or otherwise estimate a total value of a collection of unique digital articles that are currently owned by a particular player. In some implementations, monitoring component 116 may determine an estimated difference between a purchase price and a current value for a particular unique digital article (or set of unique digital articles) owned by a particular player. In some implementations, monitoring component 116 may determine an average number (or other aggregate number) of transactions involving unique digital articles recorded as owned by an individual player, or a group of players (e.g., sales transactions).

In some implementations, monitoring component 116 may be configured to track, monitor, analyze, and/or otherwise use information regarding in-game actions and/or in-game action instructions for particular players (or groups of players) or for particular unique digital articles (or correlated entities thereof). For example, monitoring component 116 may monitor in-game activity in online gaming platform 105 for (one or more types of) use of a particular unique digital article. For example, this particular unique digital article may have been distributed (or airdropped) to a particular user account based on one or more eligibility criteria as selected and/or defined by an administrative user. By virtue of this monitored in-game activity (e.g., registering the particular unique digital article for use in a game in online gaming platform 105), system 100 may link a user account on one or more permanent registries 117 to a player and their player account on online gaming platform 105. In some cases, particular types of usage of a particular unique digital article in online gaming platform 105 may require that its ownership has been recorded on a specific private permissioned permanent registry. In other cases, the particular types of usage of a particular unique digital article in online gaming platform 105 may merely require that its ownership has been recorded somewhere, even if not on a specific private permissioned permanent registry. In-game activity as monitored by monitoring component 116 may be used as a basis for operations by correlation component 127 and/or other components of system 100.

Eligibility component 118 may be configured to determine whether particular user accounts (on one or more permanent registries 117) meet particular eligibility criteria for distribution of unique digital articles and/or other virtual items that provide personalized in-game benefits. Determinations by eligibility component 118 may be based on recorded information that has been recorded on one or more permanent registries 117. The recorded information may include ownership information for a set of user accounts on a particular permanent registry (e.g., blockchain 117a). For example, the ownership information may reflect at least that a particular user account has ownership of a particular unique digital article. In some implementations, a set of eligibility criteria may include one or more of: (i) the individual user account currently having recorded ownership of a particular type of unique digital articles, (ii) the individual user account currently having recorded ownership of at least a particular number of unique digital articles, (iii) the individual user account currently having recorded ownership of at least a particular number of assets, (iv) the individual user account engaging in at least a threshold number of transactions within a predetermined timeframe, (v) an estimated value of currently owned unique digital articles by the individual user account exceeding some value threshold, (vi) the individual user account having not participated in previous distributions or airdrops, (vii) the individual user account not being linked and/or otherwise correlated to a player or player account in online gaming platform 105, and/or other eligibility criteria. Any combination of these criteria is envisioned and considered within the scope of this disclosure. In some implementations, the set of eligibility criteria may include the requirement that a particular user account on a public permanent registry has not previously been linked or otherwise correlated to any player account on online gaming platform 105. Alternatively, and/or simultaneously, the set of eligibility criteria may include the requirement that a particular user account on a public permanent registry has not previously received a unique digital article through the distribution mechanism described in this disclosure. Alternatively, and/or simultaneously, the set of eligibility criteria may include the requirement that a particular user account on a public permanent registry owns certain types of unique digital articles or NFTs. Alternatively, and/or simultaneously, the set of eligibility criteria may include the requirement that a particular user account on a public permanent registry owns at least a certain amount of tokens, currency, and/or Bitcoin. Alternatively, and/or simultaneously, the set of eligibility criteria may include the requirement that a particular user account on a public permanent registry has participated in at least a certain amount of transactions and/or other interactions on the public permanent registry.

In some implementations, the set of eligibility criteria may require the users of the user accounts to perform certain tasks in order for either the selected unique digital article to be distributed or usable, or the offer to be provided or effectuated. For example, such a task may include a social media task (e.g., join a specific channel on Discord, report a message on Twitter™, etc. etc.). In some cases, such a task may include holding a particular token or coin in the user account.

In some implementations, requests to use a particular unique digital article in accordance with a particular in-game action instruction may be granted based on one or more determinations by monitoring component 116 and/or another component of system 100. In some implementations, certain types of use of a unique digital article may require not only a particular type of request, but additionally may require the pertinent unique digital article (or other digital article that is not fungible) currently be recorded on a particular permanent registry (or a particular type of permanent registry). For example, in some cases, a requirement may include recordation on a private permissioned permanent registry. In some implementations, determinations by eligibility component 118 and/or offer component 131 may be performed responsive to particular actions or results from other components of system 100, including but not limited to monitoring component 116 and/or registry-analysis component 120.

Registry-analysis component 120 may be configured to obtain recorded information from one or more permanent registries 117. The recorded information may include ownership information for individual ones of a set of user accounts on the one or more permanent registries 117 (e.g., on blockchain 117a). The ownership information may reflect at least that a particular user account has particular ownership of a particular unique digital article. The recorded information may reflect engagement and/or interaction by individual ones of the set of user accounts on the one or more permanent registries 117 (e.g., by virtue of transactions recorded on blockchain 117a). Determinations by registry-analysis component 120 may be based on information and/or determinations by other components, including but not limited to monitoring component 116. In some implementations, registry-analysis component 120 may be configured to analyze the recorded information for a specific user account regarding engagement and/or interaction on the one or more permanent registries 117, for example for indications of specific characteristics and/or interests.

Notification component 122 may be configured to notify players. For example, notification component 122 may notify players 123 in response to airdrops, events, distributions, in-game action instructions, and/or other activities in system 100. In some implementations, a player may be notified responsive to a requested in-game action (e.g., as requested by the player through an in-game action instruction) not being permitted or not being performed. In some implementations, actions by notification component 122 may be performed responsive to particular actions, results, determinations, evaluations, consequences, and/or decisions from other components of system 100, including but not limited to monitoring component 116, registry-analysis component 120, and/or correlation component 127. For example, notification component 122 may control whether to notify a particular player. In some implementations, notifications may be outside of the game, or even outside of online gaming platform 105 (e.g., through a text message, email, or a direct message).

Action component 129 may be configured to control actions based on one or more determinations, evaluations, consequences, and/or decisions from other components of system 100. In some implementations, the actions may include notifications. In some implementations, the actions may include making and/or presenting offers to players (e.g., offers as determined by offer component 131). In some implementations, action component 129 may be configured to control taking an action and/or making a recommendation, based on one or more determinations, evaluations, consequences, and/or decisions from other components of system 100 (e.g., control the distribution of unique digital articles or other virtual items that provide personalized in-game benefits, e.g., by distribution component 124).

Distribution component 124 may be configured to distribute and/or otherwise provide one or more of information, access to in-game content, access to game-specific communication channels, certificates, rewards, awards, prizes, distribution gains, unique digital articles, and/or virtual items to players 123. For example, distribution component 124 may provide a particular distribution of a particular award to a particular unique digital article or player, such that the pertinent account inventory is increased by the particular award. A particular distribution may be provided to a particular player as part of an airdrop. In some implementations, a particular distribution may occur in response to an acceptance of an offer (e.g., an offer determined by offer component 131). In some implementations, distribution component 124 may be configured to control distributions of particular unique digital articles to particular user accounts (in accordance with offers to those user accounts).

In some implementations, distributions by distribution component 124 may be adjusted, e.g., by adjustment component 126. In some implementations, distributions may be based on operations (including but not limited to determinations) by monitoring component 116 and/or registry-analysis component 120. In some implementations, distributions may be responsive to determinations by offer component 131 or correlation component 127. In some implementations, distributions may be based on and/or responsive to actions by other components of system 100, including but not limited to registry server 111, a particular permanent registry, and/or registry-analysis component 120. For example, online gaming platform 105 may determine a particular player is eligible to participate in an airdrop. Distribution component 124 may distribute unique digital articles accordingly. For example, a reward may be a participation reward. For example, an award may be an attendance award (e.g., for a real world event). For example, a certificate may be a certificate of completion or accomplishment, which may be specific to actions within the instance of the game. For example, a prize may be for effort, time, and/or resources spent, specifically in the instance of the game. For example, particular unique digital articles may be associated with distribution rights, and the particular player who owns those distribution rights may receive distribution gains in accordance with those distribution rights. For example, distribution gains may result from a particular action or activity (such as, e.g., a sale of a particular digital article), e.g., within the online gaming platform 105, involving the particular digital article.

Adjustment component 126 may be configured to adjust and/or modify distributions, including (planned or expected) distributions by distribution component 124. In some implementations, adjustment component 126 may be configured to adjust and/or modify consequences, such as positive or negative consequences. In some implementations, adjustment component 126 may be configured to adjust and/or modify awards based on geolocation information. In some implementations, adjustment component 126 may adjust and/or modify one or more awards, certificates, rewards, awards, prizes, distributions, distribution gains, stakes, and/or virtual items that have been determined, e.g., by offer component 131. Upon such adjustment and/or modification, this determined distribution (or eligible distribution) may be referred to as the adjusted distribution. Distribution component 124 may distribute the adjusted distribution. In some implementations, adjustments and/or modifications by adjustment component 126 may increase the value of one or more elements of the eligible distribution (this may provide a positive incentive to players). Alternatively, and/or simultaneously, adjustments and/or modifications by adjustment component 126 may decrease the value of one or more elements of the eligible distribution (this may provide a negative incentive to players). In some implementations, actions by adjustment component 126 may be performed responsive to particular actions or results from other components of system 100, including but not limited to monitoring component 116 and/or registry-analysis component 120.

Correlation component 127 may be configured to establish links, relations, correlations, and/or other connections between user accounts on one or more permanent registries 117 and players (or player accounts) on online gaming platform 105. In some implementations, such connections may be based on in-game activity as monitored by monitoring component 116. In some implementations, once a link, relation, correlation, and/or other connection has been established between a particular user account on one or more permanent registries 117 and a particular player (or player account) on online gaming platform 105, system 100 (in particular offer component 131) may analyze the one or more permanent registries 117 for indications of specific characteristics and/or interests by the particular player.

Registry component 128 may be configured to generate sets of instructions for registry servers 111 (e.g., registry server 111a) and/or one or more permanent registries 117 (e.g., blockchain 117a). In some implementations, registry component 128 may be configured to transfer the generated sets of instructions to registry servers 111 and/or one or more permanent registries 117. In some implementations, one or more of these instructions may instruct the formation of a smart contract and/or the recording of the smart contract on one or more permanent registries 117 (e.g., blockchain 117a). In some implementations, one or more of these instructions may call and/or otherwise invoke a method or function of a smart contract on one or more permanent registries 117 (e.g., blockchain 117a). In some implementations, these instructions may instruct registry servers 111 to record and/or modify (sets of) unique digital articles, transactions, and/or rights on one or more permanent registries 117, or to analyze ownership as recorded on one or more permanent registries 117. In some implementations, these instructions may instruct registry servers 111 to record and/or modify sets of usage information (e.g., ownership rights) pertaining to (sets of) unique digital articles. For example, registry component 128 may transfer a particular set of instructions that, upon execution by blockchain 117a, issue a new unique digital article to a particular player or particular account (i.e., record the rights and/or other usage information pertaining to the new unique digital article, including it being owned by the particular player or the particular account). Individual unique digital articles may be associated with individual sets of usage information, including but not limited to ownership rights. For example, registry component 128 may transfer a particular set of instructions that, upon execution by blockchain 117a and blockchain 117b, remove a particular unique digital article from blockchain 117a and add the particular unique digital article to blockchain 117b. For example, registry component 128 may transfer a particular set of instructions that, upon execution by blockchain 117a and blockchain 117b, analyze whether a particular player owns one or more particular unique digital articles. In some implementations, registry component 128 may generate and transfer sets of instructions to record ownership of unique digital articles for user accounts that meet one or more eligibility criteria as determined by eligibility component 118.

Offer component 131 may be configured to determine offers to players and/or player accounts on online gaming platform 105. Offers may include one or more of unique digital articles, virtual items that provide a personalized in-game benefit, information, awards, access to in-game content, access to game-specific communication channels, certificates, rewards, prizes, distribution gains, and/or other virtual items to be provided to one or more players. These types of determinations may be based on analyses of users accounts (e.g., based on the transactions of the user accounts on one or more permanent registries 117). For example, such an analysis may reveal that a particular user account is active in a particular online game (e.g., a game outside of online gaming platform 105, such as Fortnite™). In such a case, a personalized in-game benefit may be a skin or weapon that is similar as a common or popular skin or weapon in this game. Alternatively, and/or simultaneously, for example, such an analysis may reveal that a particular user account has engaged in activities that are related to a particular professional sport (e.g., professional baseball). In such a case, a personalized in-game benefit may be a character, jersey, or accessory related to baseball (or a specific team). Alternatively, and/or simultaneously, for example, such an analysis may reveal that a particular user account has engaged in activities that are related to a particular brand or type of fashion (e.g., by a popular designer). In such a case, a personalized in-game benefit may be a character or accessory related to this designer or to the appropriate type of fashion. In some implementations, offer component 131 may be configured to transfer a determined offer to a player or player account. In some implementations, offer component 131 may be configured to present a determined offer to a player or player account, e.g., through a presentation on a client computing platform 104 and/or user interface 125. In some cases, a personalized in-game benefit may be access to a restricted area within a game. In some implementations, determining an offer includes determining personalized unique digital articles and/or personalized virtual items that provide personalized in-game benefits. In some implementations, these types of determinations may be based on and/or responsive to actions by other components of system 100, including but not limited to registry-analysis component 120. In some implementations, online gaming platform 105 may determine a particular player is eligible to receive one or more offers, rewards, or awards. Distributions of awards may be made by distribution component 124. In some implementations, (one or more elements of) these awards may be adjusted and/or modified by adjustment component 126 prior to being distributed.

Presentation component 133 may be configured to present interfaces (e.g., user interfaces 125, including but not limited to an administrative user interface) to players, e.g., through client computing platforms 104 associated with the respective players. In some implementations, presentation component 133 may be configured to effectuate presentations of interfaces to players 123. For example, presentation component 133 may effectuate a presentation of an administrative user interface to an administrative user that enables the administrative user to (a) select and/or define a set of one or more unique digital articles to be distributed to one or more user accounts, (b) select and/or define a set of one or more eligibility criteria for distribution of an individual unique digital article to an individual user account, and/or (c) select and/or define other specifics regarding distributions to users. The set of one or more unique digital articles may include a first unique digital article, ownership of which may be recorded on a permanent registry as belonging to a first user account, and in-game activity of which may be monitored by monitoring component 116 as described elsewhere in this disclosure. In some implementations, presentations by presentation component 133 may be performed jointly (or at least in some cooperative manner) with one or both of game component 108 and/or interaction component 110. Presentation component 133 may present offers (e.g., for exchanges with other players, or for exposure to consequences) to particular players.

Receipt component 136 may be configured to receive (sets of) instructions to add, modify, analyze, and/or remove recorded information (e.g., rights) in blockchain 117a. For example, receipt component 136 may receive one or more sets of instructions from registry component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117a and other components of system 100. For example, in some implementations, API 107 may support methods or functions that are implemented as function calls to smart contracts stored on blockchain 117a. For example, in some implementations, API 107 may support methods or functions that analyze whether a particular player owns one or more particular unique digital articles, one or more particular types of unique digital articles, and/or a particular collection of multiple unique digital articles. For example, in some implementations, API 107 may support methods or functions that analyze the status of a particular (type of) metric for a particular player. In some implementations, receipt component 136 may be arranged, organized, and/or otherwise included in registry server 111 and/or blockchain 117a.

Transaction component 134 may be configured to record information, including but not limited to (ownership) rights pertaining to digital articles, e.g., on one or more permanent registries 117, such as blockchain 117*a*. In some implementations, transaction component 134 may record information on electronic storage 130*b*. In some implementations, transaction component 134 may record information on blockchain 117*a*. The information may include ownership rights, distribution rights, other rights, and/or other information. For example, particular recorded information may reflect rights pertaining to a particular digital article by a particular player or group of players. For example, a particular unique digital article may represent a three-dimensional in-game player-controllable item or character that can interact with other virtual items within online gaming platform 105. Recorded information may be specific to a digital article (i.e., article-specific). For example, distribution rights for a particular digital article may designate rights to certain distributions of awards upon a specifically defined in-game action (e.g., an exchange between players) involving the particular digital article.

In some implementations, transaction component 134 may be configured to record information in blockchain 117*a*. In some implementations, transaction component 134 may add, modify, analyze, and/or remove recorded information. For example, in accordance with received instructions from receipt component 136, transaction component 134 may transfer rights pertaining to a particular digital article from a first owner to a second owner (e.g., from an original owner to a new owner, or from a loser of a challenge to a winner of the challenge) such that the recorded information on blockchain 117*a* no longer reflect the rights pertaining to the particular digital article by the first player. In some implementations, in accordance with received instructions, transaction component 134 may transfer rights pertaining to a particular digital article temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer rights pertaining to a particular digital article non-temporarily from a first owner to a second owner, e.g., when a particular exchange is not reversible or no longer reversible. In some implementations, transaction component 134 may be arranged, organized, and/or otherwise included in blockchain 117*a*.

In some implementations, transaction component 134 may be configured to obtain article-specific information (e.g., ownership rights, distribution rights, and/or other information) for particular digital articles. In some implementations, transaction component 134 may be configured to access blockchain 117*a* to obtain the article-specific information (that are recorded on blockchain 117*a*, e.g., in one or more smart contracts).

Input component 135 may be configured to receive user input from administrative users. For example, the user input may include entry and/or selection of particular information, unique digital articles, types of digital articles, virtual items, types of virtual items, and/or any entity or object that interacts with any part of system 100 and/or plays a part in the operation of system 100. In some implementations, user input may be received through an administrative user interface. For example, an administrative user may select a threshold level to be used for comparisons of player-specific values with one or more eligibility criteria. For example, an administrative user may select a particular set of unique digital articles for an airdrop. Additionally, in some implementations, the administrative user may select a particular adjustment to be enacted by adjustment component 126.

Communication component 137 may be configured to facilitate communication and/or interaction between administration server 115 and the rest of system 100. For example, communication component 137 may communicate user input received from administrative users by input component 135 to other components of system 100, particularly online gaming platform 105.

Figure 3:
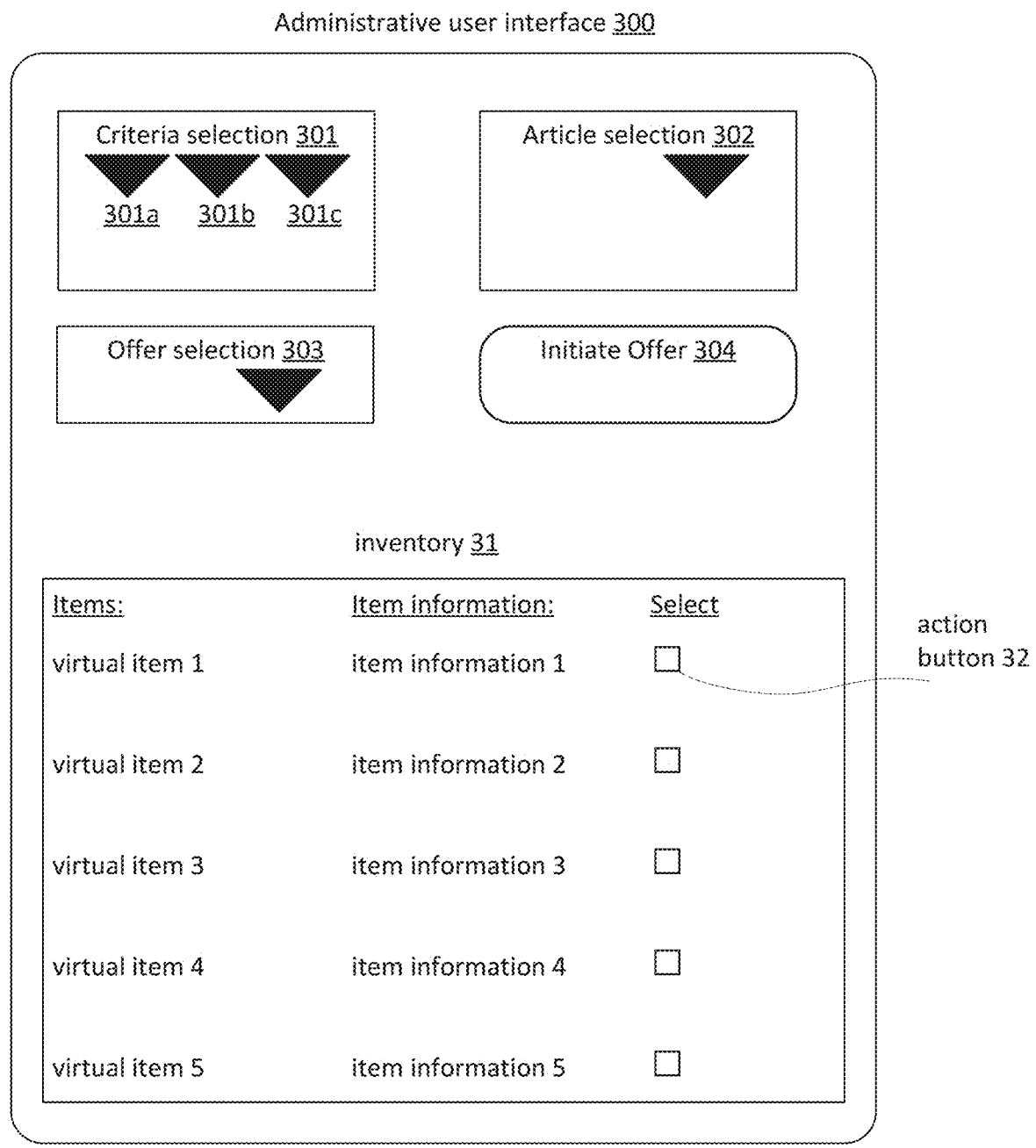
FIG. 3 illustrates an example implementation of an administrative user interface, as may be used by a system configured to distribute personalized in-game benefits based on unique digital articles that are recorded on a public permanent registry, in accordance with one or more implementations.

FIG. 3 illustrates an example implementation of an administrative user interface 300 as may be used by system 100, in accordance with one or more implementations. Administrative user interface 300 may enable users to define challenge and transmit the challenges to one or more other users. Administrative user interface 300 may include a section or field for criteria selection 301, a section or field for article selection 302, a section or field for offer selection 303, an action button to initiate offer 304, a section or field for inventory 31, and/or other graphical user interface elements. Criteria selection 301 may enable a user to enter and/or select one or more eligibility criteria, through one or more graphical user interface elements, for a particular distribution (e.g., through one or more text fields or one or more dropdown menus, as indicated by the filled-in triangles 301*a*, 301*b*, and 301*c* inside criteria selection 301). In some implementations, criteria selection 301 may include different elements that together form a set of eligibility criteria. One of the elements may be represented by triangle 301*a*, which could mean one of the following: the individual user account currently having recorded ownership of particular unique digital article "X", the individual user account currently having recorded ownership of at least a particular type "X" of unique digital article, the individual user account currently having recorded ownership of at least a particular number of unique digital articles, the individual user account engaging in at least a threshold number of transactions within a predetermined timeframe, an estimated value of currently owned unique digital articles by the individual user account exceeding some value threshold, the individual user account not being linked and/or otherwise correlated to a player or player account in online gaming platform 105, etc. etc. Another element may be represented by triangle 301*b*. Another element may be represented by triangle 301*c*. These different elements may be combined to form the set of eligibility criteria (e.g., a combination of the criteria selected by triangle 301*a*, triangle 301*b*, and triangle 301*c*). In some implementations, individual elements (e.g., the elements selected by triangle 301*a*, triangle 301*b*, and triangle 301*c*) may individually correspond to one or more instructions that form the related smart contract. Article selection 302 may enable a user to enter and/or select a (type of) unique digital article, through one or more graphical user interface elements, for the particular distribution (e.g., through a text field or a dropdown menu). For example, an individual selected article may be an item from inventory 31. For example, in some implementations, the user may be able to drag an item from inventory 31 into article selection 302. Offer selection 303 may enable a user to enter and/or select one or more articles and/or other virtual items that provide a personalized in-game benefit as part of a proposed offer to follow the particular distribution (e.g., through a text field or a dropdown menu). The action button "initiate offer 304" may enable the user to initiate a transmission to user accounts (that meet the set of eligibility criteria) that represents the offer (as defined through, at least, criteria selection 301 and article selection 302). As depicted, user inventory 41 may include a list of different virtual items and/or assets currently owned by a particular user, including virtual items 1-2-3-4-5. Inventory 31 further depicts item information regarding these virtual items, as indicated by item information 1-2-3-4-5, which correspond to virtual items 1-2-3-4-5, respectively. User inventory 31 as depicted may further include graphical user interface elements such as, by way of non-limiting example, an action button 32. Upon engagement by a user, action button 32 may select "virtual item 1" to be added to the article selection for a particular distribution (e.g., via article selection 302). In some implementations, the user may drag items from inventory 41 into article selection 302.

Referring to FIG. 1, user interfaces 125 may be configured to facilitate interaction between players 123 and system 100 and/or between players 123 and client computing platforms 104. For example, user interfaces 125 may provide an interface through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other player interface devices configured to receive and/or convey player input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Figure 4A:
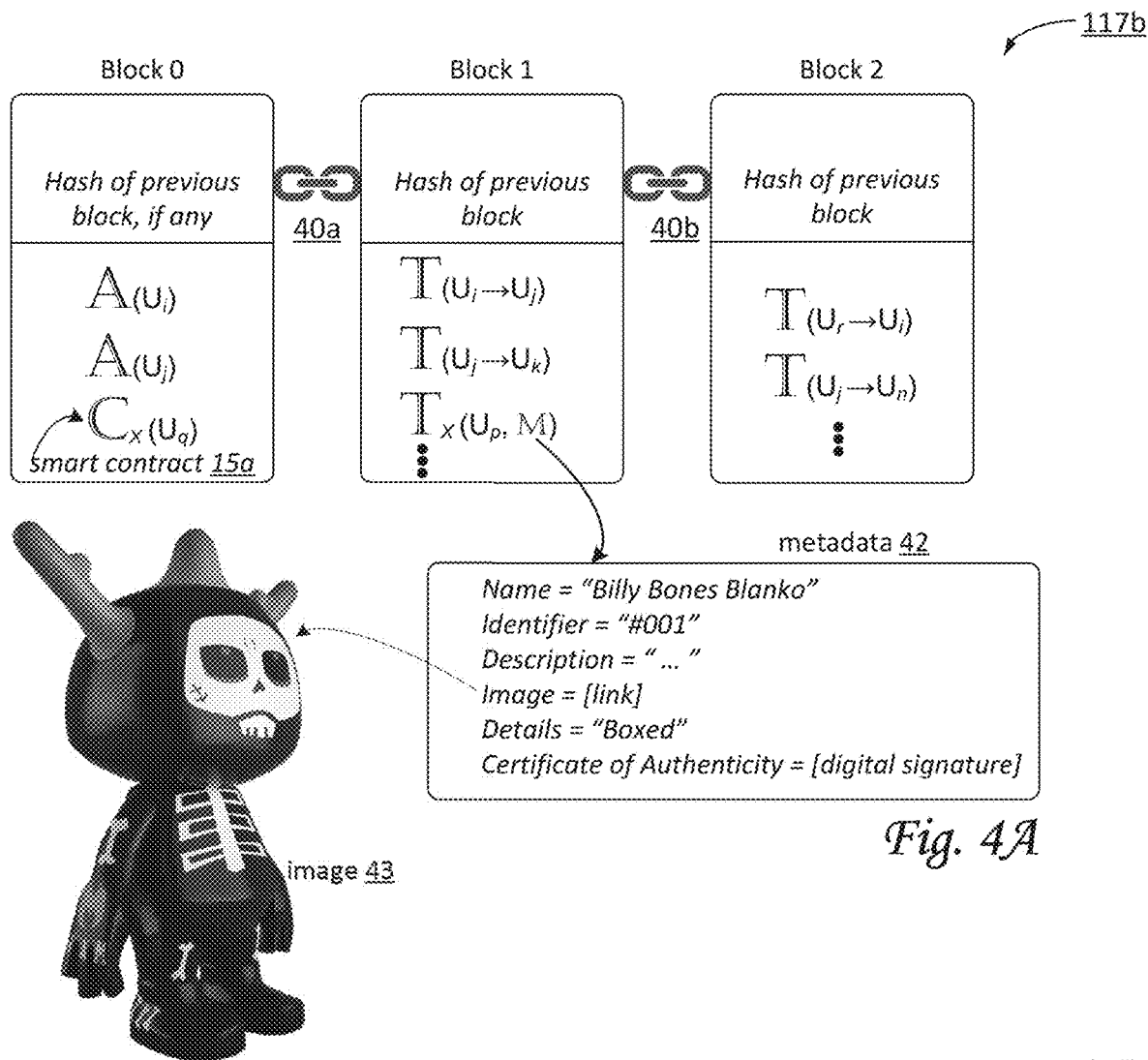
FIGS. 4A-4B illustrate exemplary permanent registries, as may be used by a system configured to distribute personalized in-game benefits based on unique digital articles that are recorded on a public permanent registry, in accordance with one or more implementations.

FIG. 4A illustrate exemplary blockchain 117b as may be used by system 100, in accordance with one or more implementations. FIG. 4A illustrates blockchain 117b that includes a block 0, a block 1, and a block 2. As time progresses, more blocks may be added to blockchain 117b. The blocks within blockchain 117b are ordered. In block 0, three assets (two of which are indicated by a capital "A") are generated and/or assigned to three users or participants: a first digital asset is assigned to user "i" ($U_i$), a second digital asset is assigned to user "j" ($U_j$), and a third digital asset, smart contract 15a, is assigned to user "q" ($U_q$), which may be an administrative user. For example, smart contract 15a may be or include a template for distribution-specific smart contracts. For example, smart contract 15a may have been generated by a component of system 100. Smart contract 15a may have been posted to blockchain 117b by a component similar to record component 134. In some implementations, smart contract 15a may be recorded on blockchain 117b.

For example, the assets in block 0 may be individual ownership rights recorded for particular digital assets within an online gaming platform. Block 1 is connected to block 0 (as indicated by a link 40a), for example by including an address of block 1 in block 0, or vice versa. Likewise, block 1 is connected to block 2, as indicated by a link 40b. In block 1, a transaction to smart contract 15a (indicated by "Tx") is recorded, e.g., for a specific distribution. Transaction Tx to smart contract 15a may define a particular distribution to user "p", for the unique digital article defined by metadata 42 (here, including a not-fungible token named "Billy Bones Blanko", as depicted by image 43, with metadata 42 including various exemplary fields such as "Identifier", "Description", "Image", "Details", and "Certificate of Authenticity"). For example, the "Details" field may have a particular value, here "Boxed", which may reflect a particular status of this unique digital article, such as whether it's currently boxed. For example, user "p" may have been selected based on other transactions recorded on blockchain 117b (e.g., as determined by eligibility component 118). In block 2, several transactions may be recorded: a transaction from user "j" to user "n", and a transaction from user "r" to user "i".

Figure 4B:
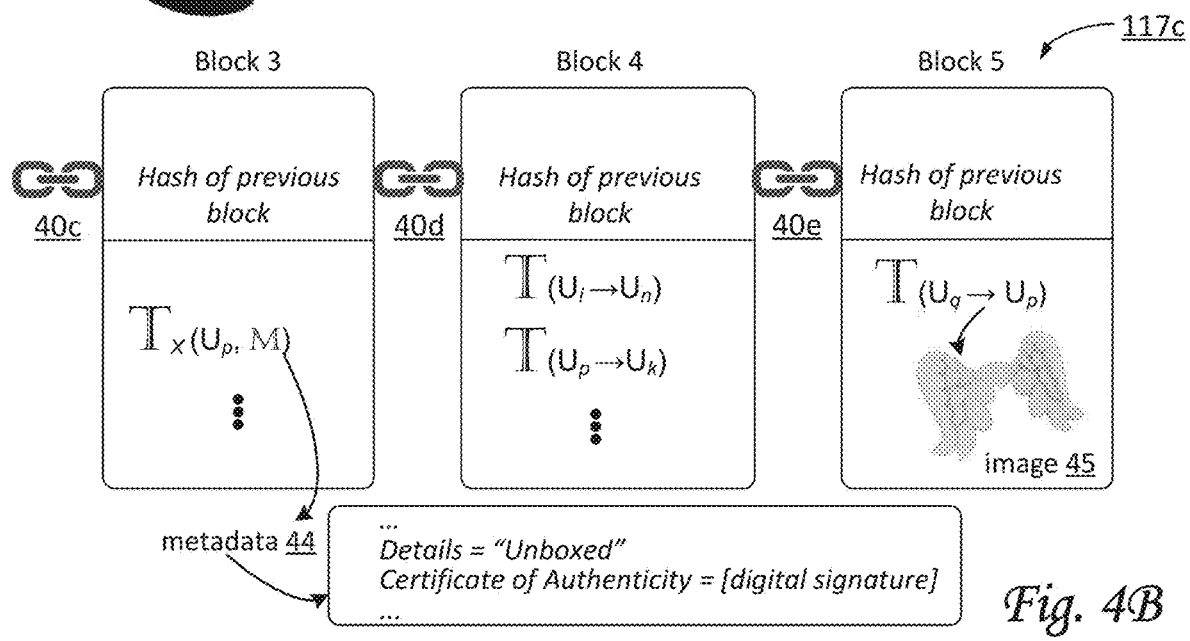

By way of non-limiting example, FIG. 4B illustrates a blockchain 117c that includes the same blocks as blockchain 117b of FIG. 4A, plus additional blocks (block 3, block 4, block 5) that have been appended to the blockchain. Block 3 may be connected to block 2 (as indicated by a link 40c), block 4 may be connected to block 3 (as indicated by a link 40d), and block 5 may be connected to block 4 (as indicated by a link 40e). In block 3, another transaction to smart contract 15a (indicated by "Tx") is recorded, e.g., for a different specific challenge. This transaction Tx to smart contract 15a may define a particular in-game activity by user "p", using the same unique digital article such that its metadata 44 is modified (e.g., the "Details" field may be modified to "Unboxed" based on in-game activity by the player). Subsequent to the events in Block 3, an administrative user may effectuate the determination, transfer, and presentation of a personalized offer to user "p" which provides a personalized in-game benefit, which may be subsequently accepted. Block 4 includes transactions (indicated by a capital "T") from user "i" to user "n", and from user "p" to user "k". For example, the transaction may represent purchases. Block 5 includes a transaction (by administrative user "q") representing a transfer of a personalized unique digital article (in accordance with the determined offer) (here, a unique digital article representing a pair of wings, as depicted by image 45) from user "q" to user "p".

Referring to FIG. 1, in some implementations, online gaming platforms 105, server(s) 102, client computing platform(s) 104, administration servers 115, registry servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, registry servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104. For example, an individual client computing platform 104 may include a geolocation sensor (e.g., a Global Positioning System or GPS device). The geolocation sensor may be configured to generate output signals conveying GPS information (e.g., a set or range of GPS coordinates) and/or other geolocation information, which may be used by the individual client computing platform 104 to determine the current location of the individual client computing platform 104.

Administration server(s) 115 may include one or more of servers 102a, processors 132a, machine-readable instructions 106a, electronic storage 130a, and/or other components. Server(s) 102a may be configured by machine-readable instructions 106a. Machine-readable instructions 106a may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or player one or more player interfaces to receive player input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, one or more external resources 138 may provide information (e.g., event information regarding events that are occurring and/or have occurred in the real world) to other components of system 100. In some implementations, external resources 138 may include one or more real-world information servers or blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 127, 128, 129, 131, 133, 134, 135, 136, and/or 137, and/or other components. Processor(s) 132 may be configured to execute components 108, 110, 112, 114, 116, 118, 120, 122, 124, 126, 127, 128, 129, 131, 133, 134, 135, 136, and/or 137, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 127, 128, 129, 131, 133, 134, 135, 136, and/or 137 are illustrated in FIG. 1 as being implemented within a single processing unit, in implementations in which processor(s) 132 includes multiple processing units, one or more of components 108, 110, 112, 114, 116, 118, 120, 122, 124, 126, 127, 128, 129, 131, 133, 134, 135, 136, and/or 137 may be implemented remotely from the other components. The description of the functionality provided by the different components 108, 110, 112, 114, 116, 118, 120, 122, 124, 126, 127, 128, 129, 131, 133, 134, 135, 136, and/or 137 described below is for illustrative purposes only, and is not intended to be limiting, as any of components 108, 110, 112, 114, 116, 118, 120, 122, 124, 126, 127, 128, 129, 131, 133, 134, 135, 136, and/or 137 may provide more or less functionality than is described. For example, one or more of components 108, 110, 112, 114, 116, 118, 120, 122, 124, 126, 127, 128, 129, 131, 133, 134, 135, 136, and/or 137 may be eliminated, and some or all of its functionality may be provided by other ones of components 108, 110, 112, 114, 116, 118, 120, 122, 124, 126, 127, 128, 129, 131, 133, 134, 135, 136, and/or 137. As another example, processor(s) 132 may be configured to execute one or more additional components that may perform some or all of the functionality attributed below to one of components 108, 110, 112, 114, 116, 118, 120, 122, 124, 126, 127, 128, 129, 131, 133, 134, 135, 136, and/or 137.

Figure 2:
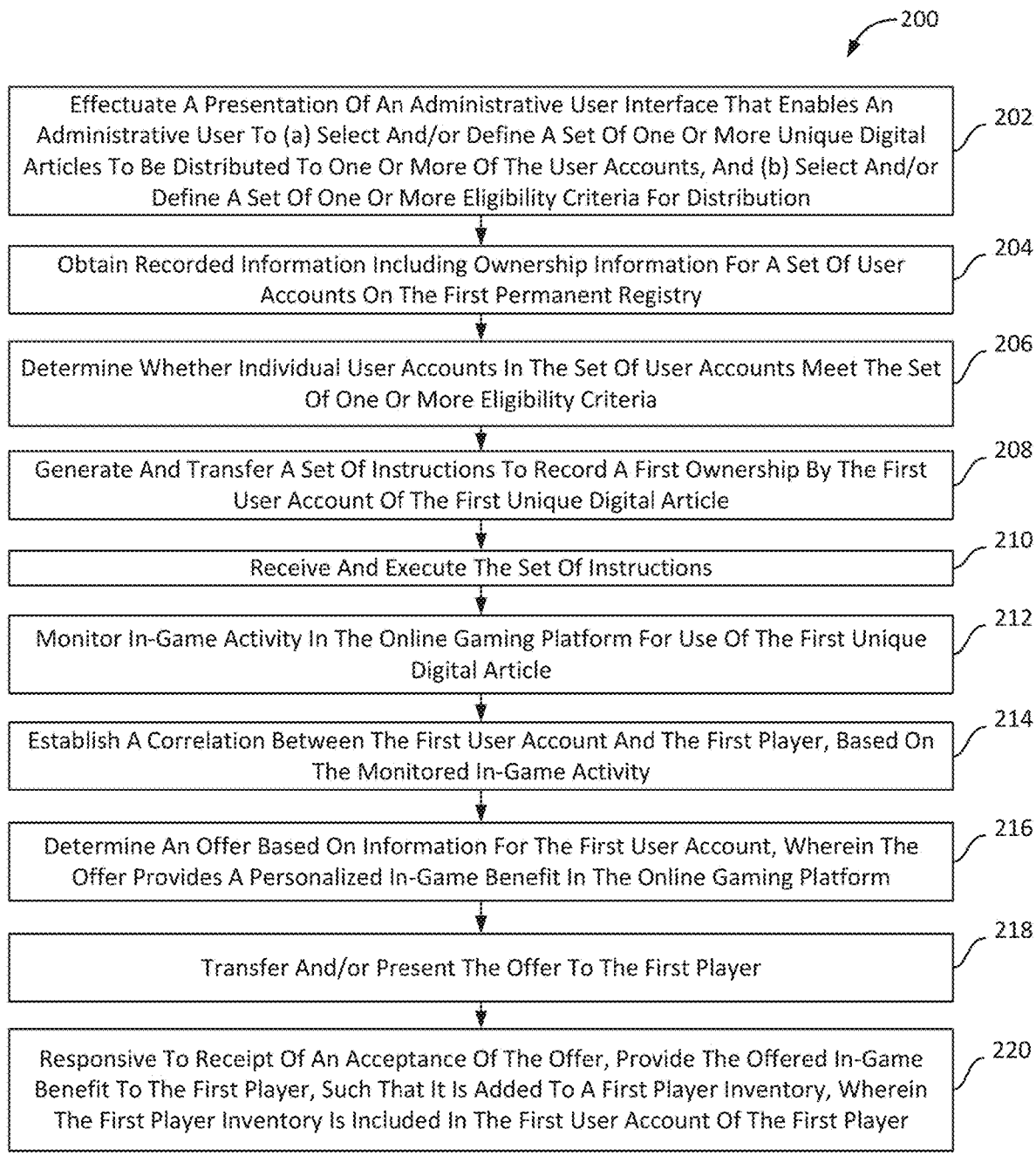
FIG. 2 illustrates a method of distributing unique digital articles to users accounts of a public permanent registry, and of facilitating personalized in-game benefits for players on an online gaming platform, in accordance with one or more implementations.

FIG. 2 illustrates a method 200 of distributing unique digital articles to users accounts of a permanent registry, and of facilitating personalized in-game benefits for players on an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a presentation of an administrative user interface is effectuated that enables an administrative user to (a) select and/or define a set of one or more unique digital articles to be distributed to one or more of the user accounts. The set of one or more unique digital articles includes a first unique digital article, and (b) select and/or define a set of one or more eligibility criteria for distribution of an individual unique digital article to an individual user account. In some embodiments, operation 202 is performed by a presentation component the same as or similar to presentation component 133 (shown in FIG. 1 and described herein).

At an operation 204, recorded information that has been recorded on the first permanent registry is obtained. The recorded information includes ownership information for a set of user accounts on the first permanent registry. The ownership information reflects at least that the first user account has particular ownership of a particular (type of) unique digital article. In some embodiments, operation 204 is performed by a registry-analysis component the same as or similar to registry-analysis component 120 (shown in FIG. 1 and described herein).

At an operation 206, it is determined, based on the recorded information and the set of one or more eligibility criteria, whether individual user accounts in the set of user accounts meet the set of one or more eligibility criteria, including a first determination that the first user account meets the set of one or more eligibility criteria by virtue of the particular ownership by the first user account of the particular unique digital article. In some embodiments, operation 206 is performed by an eligibility component the same as or similar to eligibility component 118 (shown in FIG. 1 and described herein).

At an operation 208, a set of instructions is generated and transferred to record ownership of the set of one or more unique digital articles as being owned by the individual user accounts in the set of user accounts that meet the set of one or more eligibility criteria, including recording a first ownership by the first user account of the first unique digital article. The ownership of the set of one or more unique digital articles is recorded on the first permanent registry. The set of instructions are based at least in part on the recorded information. The set of instructions may be transferred to a registry server. In some embodiments, operation 208 is performed by a registry component the same as or similar to registry component 128 (shown in FIG. 1 and described herein).

At an operation 210, the set of instructions is received and executed on the first permanent registry such that the ownership of the set of one or more unique digital articles is recorded on the first permanent registry, including the first ownership by the first user account of the first unique digital article. In some embodiments, operation 210 is performed by a receipt component and/or a transaction component the same as or similar to receipt component 136 and/or transaction component 134 (shown in FIG. 1 and described herein).

At an operation 212, in-game activity is monitored in the online gaming platform for use of the first unique digital article. The monitored in-game activity includes use of the first unique digital article by the first player. In some embodiments, operation 212 is performed by a monitoring component the same as or similar to monitoring component 116 (shown in FIG. 1 and described herein).

At an operation 214, a correlation is established between the first user account and the first player, based on the monitored in-game activity. In some embodiments, operation 214 is performed by a correlation component the same as or similar to correlation component 127 (shown in FIG. 1 and described herein).

At an operation 216, an offer is determined based on information pertaining to the first user account. The offer may include a second unique digital article or another virtual item that provides a personalized in-game benefit. The second unique digital article is associated with an in-game character or item configured to provide a personalized in-game benefit in the online gaming platform. In some embodiments, operation 216 is performed by an offer component the same as or similar to offer component 131 (shown in FIG. 1 and described herein).

At an operation 218, the offer is transferred and/or presented to the first player. In some embodiments, operation 218 is performed by an offer component and/or presentation component the same as or similar to offer component 131 and/or presentation component 133 (shown in FIG. 1 and described herein).

At an operation 220, responsive to receipt of an acceptance of the offer, the second unique digital article or the other virtual item is provided to the first player, such that the second unique digital article is added to a first player inventory. The first player inventory is included in the first user account of the first player. In some embodiments, operation 220 is performed by a distribution component the same as or similar to distribution component 124 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to distribute unique digital articles to users accounts of a first permanent registry, wherein the first permanent registry is a public permanent registry that is an append-only blockchain, and to facilitate personalized in-game benefits for players on an online gaming platform, wherein the user accounts include a first user account, and wherein the players include a first player, the system comprising:

one or more processors configured by machine-readable instructions to:
  present an administrative user interface that enables an administrative user to:
    (a) select and/or define a set of one or more unique digital articles to be distributed to one or more of the user accounts, wherein the set of one or more unique digital articles includes a first unique digital article that is associated with a first in-game user-controllable character, wherein the first in-game user-controllable character is usable in the online gaming platform,
    (b) select and/or define a set of one or more eligibility criteria for distribution of an individual unique digital article to an individual user account;
  receive recorded information that has been recorded on the first permanent registry, wherein the recorded information includes ownership information for a set of user accounts on the first permanent registry, wherein the ownership information reflects at least that the first user account has particular ownership of a particular unique digital article;
  determine, based on the recorded information and the set of one or more eligibility criteria, whether individual user accounts in the set of user accounts meet the set of one or more eligibility criteria, including a first determination that the first user account meets the set of one or more eligibility criteria by virtue of the particular ownership by the first user account of the particular unique digital article;
  generate and transfer a set of instructions to record ownership of the set of one or more unique digital articles as being owned by the individual user accounts in the set of user accounts that meet the set of one or more eligibility criteria, including recording a first ownership by the first user account of the first unique digital article, wherein the ownership of the set of one or more unique digital articles is recorded on the first permanent registry, and wherein the set of instructions is transferred to a registry server;
the registry server including one or more particular hardware processors configured by one or more particular machine-readable instructions to:
  receive the set of instructions and execute the set of instructions on the first permanent registry such that the ownership of the set of one or more unique digital articles is recorded on the first permanent registry, including the first ownership by the first user account of the first unique digital article; and
wherein the one or more processors are further configured to:
  monitor in-game activity in the online gaming platform for use of the first unique digital article, wherein the monitored in-game activity includes use of the first unique digital article by the first player through the first in-game user-controllable character in the online gaming platform;
  establish a correlation between the first user account and the first player, based on the monitored in-game activity, wherein the correlation includes a link between a first player account of the first player in the online gaming platform and the first user account on the first permanent registry;
  determine an offer based on information pertaining to the first user account, wherein the offer includes distributing a second unique digital article to the first player, wherein the second unique digital article is associated with a particular in-game character or item configured to provide a personalized in-game benefit in the online gaming platform;
  transfer and/or present the offer to the first player; and
  responsive to receipt of an acceptance of the offer, distributing the particular in-game character or item to the first player, such that the particular in-game character or item is added to a first player inventory, and further such that ownership of the second unique digital article is recorded on the first permanent registry as being the first user account, and wherein the first player inventory is associated with the first player account of the first player in the online gaming platform.

2. The system of claim 1, wherein one or more types of use of the first unique digital article in the online gaming platform require the ownership of the first unique digital article being recorded on a second permanent registry, wherein the second permanent registry is a private permissioned blockchain.

3. The system of claim 1, wherein one or more types of usage of the second unique digital article in the online gaming platform require ownership of the second unique digital article being recorded on a second permanent registry.

4. The system of claim 1, wherein the online gaming platform includes a set of processors configured by a set of machine-readable instructions to:
  execute, within the online gaming platform, an instance of a game to facilitate presentation of the game to the players, and implement in-game actions in the instance of the game in response to in-game action instructions for the in-game actions by the players, wherein the presentation of the game is based on views of the game that are determined during execution of the instance of the game; and
  manage player accounts associated with the players, wherein the player accounts include player inventories that include a set of unique digital articles, wherein the players control the set of unique digital articles that are associated with a set of in-game user-controllable characters, wherein the player accounts include the first player account, and wherein the player inventories include the first player inventory of the first player.

5. The system of claim 1, wherein the set of one or more eligibility criteria for distribution of the individual unique digital article to the individual user account includes one or more of:
  (i) the individual user account currently having recorded ownership of a particular type of unique digital articles,
  (ii) the individual user account currently having recorded ownership of at least a particular number of unique digital articles,
  (iii) the individual user account currently having recorded ownership of at least a particular number of assets,
  (iv) the individual user account engaging in at least a threshold number of transactions within a predetermined timeframe.

6. The system of claim 1, wherein the information on which determination of the offer is based includes ownership information for assets owned by the first user account.

7. The system of claim 1, wherein the offer is free to the first player.

8. The system of claim 1, wherein the offer requires an amount of consideration from the first player.

9. A method of distributing unique digital articles to users accounts of a first permanent registry, wherein the first permanent registry is a public permanent registry that is an append-only blockchain, and of facilitating personalized in-game benefits for players on an online gaming platform, wherein the user accounts include a first user account, and wherein the players include a first player, the method comprising:

presenting an administrative user interface that enables an administrative user to (a) select and/or define a set of one or more unique digital articles to be distributed to one or more of the user accounts, wherein the set of one or more unique digital articles includes a first unique digital article that is associated with a first in-game user-controllable character, wherein the first in-game user-controllable character is usable in the online gaming platform, and (b) select and/or define a set of one or more eligibility criteria for distribution of an individual unique digital article to an individual user account;

receiving recorded information that has been recorded on the first permanent registry, wherein the recorded information includes ownership information for a set of user accounts on the first permanent registry, wherein the ownership information reflects at least that the first user account has particular ownership of a particular unique digital article;

determining, based on the recorded information and the set of one or more eligibility criteria, whether individual user accounts in the set of user accounts meet the set of one or more eligibility criteria, including a first determination that the first user account meets the set of one or more eligibility criteria by virtue of the particular ownership by the first user account of the particular unique digital article;

generating and transferring a set of instructions to record ownership of the set of one or more unique digital articles as being owned by the individual user accounts in the set of user accounts that meet the set of one or more eligibility criteria, including recording a first ownership by the first user account of the first unique digital article, wherein the ownership of the set of one or more unique digital articles is recorded on the first permanent registry, and wherein the set of instructions is transferred to a registry server;

receiving the set of instructions and executing the set of instructions on the first permanent registry such that the ownership of the set of one or more unique digital articles is recorded on the first permanent registry, including the first ownership by the first user account of the first unique digital article; and monitoring in-game activity in the online gaming platform for use of the first unique digital article, wherein the monitored in-game activity includes use of the first unique digital article by the first player through the first in-game user-controllable character in the online gaming platform;

establishing a correlation between the first user account and the first player, based on the monitored in-game activity, wherein the correlation includes a link between a first player account of the first player in the online gaming platform and the first user account on the first permanent registry;

determining an offer based on information pertaining to the first user account, wherein the offer includes distributing a second unique digital article to the first player, wherein the second unique digital article is associated with a particular in-game character or item configured to provide a personalized in-game benefit in the online gaming platform;

transferring and/or presenting the offer to the first player; and responsive to receipt of an acceptance of the offer, distributing the particular in-game character or item to the first player, such that the particular in-game character or item is added to a first player inventory, and further such that ownership of the second unique digital article is recorded on the first permanent registry as being the first user account, and wherein the first player inventory is associated with the first player account of the first player in the online gaming platform.

10. The method of claim 9, wherein one or more types of use of the first unique digital article in the online gaming platform require the ownership of the first unique digital article being recorded on a second permanent registry, wherein the second permanent registry is a private permissioned blockchain.

11. The method of claim 9, wherein one or more types of usage of the second unique digital article in the online gaming platform require the ownership of the second unique digital article being recorded on a second permanent registry.

12. The method of claim 9, further comprising:

executing, within the online gaming platform, an instance of a game to facilitate presentation of the game to the players, and implement in-game actions in the instance of the game in response to in-game action instructions for the in-game actions by the players, wherein the presentation of the game is based on views of the game that are determined during execution of the instance of the game; and managing player accounts associated with the players, wherein the player accounts include player inventories that include a set of unique digital articles, wherein the players control the set of unique digital articles that are associated with a set of in-game user-controllable characters, wherein the player accounts include the first player account, and wherein the player inventories include the first player inventory of the first player.

13. The method of claim 12, wherein the set of one or more eligibility criteria for distribution of the individual unique digital article to the individual user account includes one or more of:

(i) the individual user account currently having recorded ownership of a particular type of unique digital articles,
(ii) the individual user account currently having recorded ownership of at least a particular number of unique digital articles,
(iii) the individual user account currently having recorded ownership of at least a particular number of assets,
(iv) the individual user account engaging in at least a threshold number of transactions within a predetermined timeframe.

14. The method of claim 9, wherein the information on which determination of the offer is based includes ownership information for assets owned by the first user account.

15. The method of claim 9, wherein the offer is free to the first player.

16. The method of claim 9, wherein the offer requires an amount of consideration from the first player.

* * * * *